United States Patent
Cartwright et al.

(10) Patent No.: US 9,565,314 B2
(45) Date of Patent: *Feb. 7, 2017

(54) SPATIAL MULTIPLEXING IN A SOUNDFIELD TELECONFERENCING SYSTEM

(71) Applicant: Dolby Laboratories Licensing Corporation, San Francisco, CA (US)

(72) Inventors: Richard J. Cartwright, Killara (AU); David S. McGrath, Rose Bay (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/431,247

(22) PCT Filed: Sep. 25, 2013

(86) PCT No.: PCT/US2013/061643
§ 371 (c)(1),
(2) Date: Mar. 25, 2015

(87) PCT Pub. No.: WO2014/052429
PCT Pub. Date: Apr. 3, 2014

(65) Prior Publication Data
US 2015/0244869 A1    Aug. 27, 2015

Related U.S. Application Data

(60) Provisional application No. 61/706,285, filed on Sep. 27, 2012.

(51) Int. Cl.
*H04M 3/56*     (2006.01)
*H04R 5/04*     (2006.01)
*H04S 7/00*     (2006.01)

(52) U.S. Cl.
CPC ............ *H04M 3/561* (2013.01); *H04M 3/568* (2013.01); *H04R 5/04* (2013.01); *H04S 7/302* (2013.01); *H04M 2203/509* (2013.01)

(58) Field of Classification Search
CPC   H04M 3/568; H04M 3/561; H04M 2203/509; H04S 7/302; H04R 5/04
See application file for complete search history.

(56) References Cited

U.S. PATENT DOCUMENTS 5,757,927 A    5/1998   Gerzon
5,936,662 A    8/1999   Kim
(Continued)

FOREIGN PATENT DOCUMENTS

WO    2007/095640    8/2007
WO    2009/001035    12/2008
(Continued)

*Primary Examiner* — Jianye Wu

(57) ABSTRACT

The present document relates to audio conference systems. In particular, the present document relates to the mapping of soundfields within an audio conference system. A conference multiplexer (110, 175, 210, 400) configured to place a first input soundfield signal (402) originating from a first soundfield endpoint (120, 170) within a 2D or 3D conference scene (300) to be rendered to a listener (301) is described. The first input soundfield signal (402) is indicative of a soundfield captured by the first soundfield endpoint (120, 170). The conference multiplexer (110, 175, 210, 400) is configured to set up the conference scene (300) comprising a plurality of talker locations (321, 322, 332, 331) at different angles (323, 333) with respect to the listener (301); provide a first sector (325); wherein the first sector (325) has a first angular width (324); wherein the first angular width (324) is greater than zero; and transform the first input soundfield signal (402) into a first output soundfield signal (403), such that for the listener (301) the first output soundfield signal (403) appears to be emanating from one or more
(Continued)

virtual talker locations (321, 322) within the first sector (325).

20 Claims, 7 Drawing Sheets

(56) References Cited

U.S. PATENT DOCUMENTS

| | | | |
|---|---|---|---|
| 6,212,208 B1 | 4/2001 | Yoneda | |
| 6,285,661 B1 | 9/2001 | Zhu | |
| 6,694,033 B1 | 2/2004 | Rimell | |
| 6,898,620 B1 | 5/2005 | Ludwig | |
| 7,152,093 B2 | 12/2006 | Ludwig | |
| 7,593,032 B2 | 9/2009 | Civanlar | |
| 7,751,480 B2 | 7/2010 | Yavits | |
| 7,839,434 B2 | 11/2010 | Ciudad | |
| 7,864,251 B2 | 1/2011 | Gu | |
| 7,903,137 B2 | 3/2011 | Oxford | |
| 7,908,320 B2 | 3/2011 | Ludwig | |
| 8,073,125 B2 * | 12/2011 | Zhang | H04M 3/56 |
| | | | 379/202.01 |
| 8,144,854 B2 | 3/2012 | Rodman | |
| 8,976,977 B2 * | 3/2015 | De Sena | H04R 3/005 |
| | | | 381/17 |
| 2008/0004729 A1 | 1/2008 | Hiipakka | |
| 2008/0211901 A1 | 9/2008 | Civanlar | |
| 2008/0267413 A1 | 10/2008 | Faller | |
| 2008/0298597 A1 | 12/2008 | Turku | |
| 2008/0298610 A1 | 12/2008 | Virolainen | |
| 2009/0040289 A1 * | 2/2009 | Hetherington | H04N 7/142 |
| | | | 348/14.12 |
| 2009/0052351 A1 | 2/2009 | James | |
| 2009/0080632 A1 | 3/2009 | Zhang | |
| 2009/0252356 A1 | 10/2009 | Goodwin | |
| 2009/0295905 A1 | 12/2009 | Civanlar | |
| 2009/0296954 A1 | 12/2009 | Hooley | |
| 2010/0305952 A1 | 12/2010 | Mouhssine | |
| 2011/0040395 A1 * | 2/2011 | Kraemer | G10L 19/00 |
| | | | 700/94 |
| 2011/0051940 A1 | 3/2011 | Ishikawa | |
| 2011/0096915 A1 | 4/2011 | Nemer | |
| 2011/0138018 A1 | 6/2011 | Raveendran | |
| 2012/0013746 A1 | 1/2012 | Chen | |
| 2012/0035918 A1 * | 2/2012 | Frankkila | G10L 19/167 |
| | | | 704/201 |
| 2012/0155653 A1 * | 6/2012 | Jax | G10L 19/008 |
| | | | 381/22 |
| 2013/0148812 A1 * | 6/2013 | Corteel | H04S 7/30 |
| | | | 381/17 |
| 2015/0221319 A1 * | 8/2015 | Cartwright | G10L 19/012 |
| | | | 704/205 |

FOREIGN PATENT DOCUMENTS

| | | |
|---|---|---|
| WO | 2011/073210 | 6/2011 |
| WO | 2012/059280 | 5/2012 |
| WO | 2014/046916 | 3/2014 |
| WO | 2014/046923 | 3/2014 |
| WO | 2014/046944 | 3/2014 |

* cited by examiner

SPATIAL MULTIPLEXING IN A SOUNDFIELD TELECONFERENCING SYSTEM

TECHNICAL FIELD

The present document relates to audio conference systems. In particular, the present document relates to the mapping of soundfields within an audio conference system.

BACKGROUND

Audio conference systems allow a plurality of parties at a plurality of different terminals to communicate with one another. The plurality of terminals (which are also referred to as endpoints) may have different capabilities. By way of example, one or more terminals may be monophonic endpoints which capture a single mono audio stream. Examples for such monophonic endpoints are a traditional telephone, a device with a headset and a boom microphone, or a laptop computer with an in-built microphone. On the other hand, one or more terminals may be soundfield endpoints which capture a multi-channel representation of the soundfield incident at a microphone array. An example for a soundfield endpoint is a conferencing telephone equipped with a soundfield microphone.

An audio conference system which is configured to taken into account the soundfield information provided by a soundfield endpoint, e.g. for designing a conference scene, is referred to herein as a soundfield conference system. The present document addresses the technical problem of creating a conference scene for audio conference systems which comprise soundfield endpoints. In particular, the present document addresses the technical problem of mixing and/or multiplexing the audio signals coming from a plurality of endpoints, wherein at least one of the plurality of endpoints is a soundfield endpoint. A particular aspect of the present document is to provide schemes that integrate one or more soundfields together, so that a listener enjoys a perceptually continuous, natural, and/or enveloping teleconferencing experience in which he/she can clearly understand the speech, can identify who is talking at any particular time and/or can identify at which endpoint each talker is located.

SUMMARY

According to an aspect a conference multiplexer is described. The conference multiplexer is configured to place a first input soundfield signal originating from a first soundfield endpoint within a 2D (2-dimensional) or 3D (3-dimensional) conference scene to be rendered to a listener. The first input soundfield signal may be indicative of a soundfield captured by the first soundfield endpoint. The first soundfield endpoint may comprise an array of microphones which is configured to capture the first input soundfield signal. The first input soundfield signal may comprise a multi-channel audio signal indicative of a direction of arrival of a sound signal coming from a talker at the first soundfield endpoint. The multi-channel audio signal may be indicative of the position of one or more talkers at the first soundfield endpoint. By way of example, the first input soundfield signal may comprise a first-order ambisonic input signal. Such a first-order ambisonic input signal typically comprises an omnidirectional input channel and at least two directional input channels, wherein the at least two directional input channels are associated with at least two directions which are orthogonal with respect to one another. In case of a first-order horizontal ambisonic input signal, the input signal comprises an omnidirectional input channel W and two directional input channels X and Y.

The conference multiplexer may be configured to set up the 2-dimensional (2D) or 3-dimensional (3D) conference scene comprising a plurality of talker locations. The talker locations may be positioned at different angles with respect to the listener. In particular, the plurality of talker locations may be located at different angles on a circle (in case of a 2D conference scene) or a sphere (in case of a 3D conference scene) around the listener. Even more particularly, the plurality of talker locations may be located at different azimuth angles on the circle or sphere.

The conference multiplexer may be further configured to provide a first sector on the circle of the sphere, wherein the first sector has a first angular width and wherein the first angular width is greater than zero. In particular, the first sector may have an azimuth angular width greater than $0°$ and smaller than $360°$. In an embodiment, the conference scene is a 2D conference scene. A first midpoint of the first sector may be located at a first azimuth angle from an axis in front of a head of the listener (e.g. the x-axis). Furthermore, the first sector may have a first azimuth angular width and the first sector may range from an outer angle at the first azimuth angle plus half of the first azimuth angular width to an inner angle at the first azimuth angle minus half of the first azimuth angular width. The inner angle may correspond to an inner talker location and the outer angle may correspond to an outer talker location.

The conference multiplexer may be further configured to transform the first input soundfield signal into a first output soundfield signal, such that for the listener the first output soundfield signal appears to be emanating from the first sector. In particular, the conference multiplexer may be configured to transform the first input soundfield signal into a first output soundfield signal, such that for the listener the first output soundfield signal appears to be emanating from one or more virtual talker locations within the first sector. In a similar manner to the first input soundfield signal, the first output soundfield signal may comprise a multi-channel signal, e.g. a first-order ambisonic signal.

The plurality of talker locations may comprise a first inner talker location and a first outer talker location which define inner and outer edges of the first sector, respectively. The conference multiplexer may be configured to transform the first input soundfield signal into the first output soundfield signal, such that the first output soundfield signal is producible by virtual sources located at the first inner talker location and at the first outer talker location, respectively. In other words, the conference multiplexer may be configured to transform the first input soundfield signal into the first output soundfield signal, such that for the listener the first output soundfield signal appears to be emanating from virtual sources located at the first inner talker location and the first outer talker location, respectively. The virtual sources may be planar wave sources. As such, the first output soundfield signal may comprise planar waves originating from virtual sources at the inner and outer talker locations. Hence, the conference multiplexer may be configured to project the first input soundfield signal onto the first sector, thereby yielding the first output soundfield signal.

A transform used to transform the first input soundfield signal into the first output soundfield signal may be decomposable into a first transform configured to transform the first input soundfield signal into left and right source signals. The left and right source signals typically appear to the listener as emanating from a left and right virtual source located to the left and to the right of the listener on an axis along the left and the right of the listener (e.g. along a y-axis). In other words, if rendered, the left and right source signals would appear to the listener to be emanating from a left and right virtual source located to the left and to the right of the listener on an axis along the left and the right of the listener. Furthermore, the transform may be decomposable into a second transform configured to transform the left and right source signals into the output soundfield signal, such that the left source signal appears to the listener to be emanating from the first outer talker location and such that the right source signal appears to the listener to be emanating from the first inner talker location.

The first transform may correspond to $$\begin{bmatrix} L \\ R \end{bmatrix} = \begin{bmatrix} 0.5 & 0 & 0.5 \\ 0.5 & 0 & -0.5 \end{bmatrix} \begin{bmatrix} W \\ X \\ Y \end{bmatrix},$$

with L and R being the left and right source signals, respectively, with W being an omnidirectional component or channel of the first input soundfield signal, with X being an X-directional component or channel of the first input soundfield signal for an axis along the front and the back of the listener (e.g. an x-axis), and with Y being an Y-directional component or channel of the first input soundfield signal for the axis along the left and the right of the listener (e.g. the y-axis).

The second transform may correspond to $$\begin{bmatrix} W' \\ X' \\ Y' \end{bmatrix} = \begin{bmatrix} 1 & 1 \\ \cos(\theta_L) & \cos(\theta_R) \\ \sin(\theta_L) & \sin(\theta_R) \end{bmatrix} \begin{bmatrix} L \\ R \end{bmatrix},$$

with the angle $\theta_L$ being the azimuth angle of the first outer talker location, with $\theta_R$ being the azimuth angle of the first inner talker location, with W' being an omnidirectional component or channel of the first output soundfield signal, with X' being an X-directional component or channel of the first output soundfield signal for the axis along the front and back of the listener (e.g. the x-axis), and with Y' being a Y-directional component or channel of the first output soundfield signal for the axis along the left and the right of the listener (e.g. the y-axis).

As already indicated above, the first output soundfield signal may comprise a multi-channel audio signal indicative of a sound signal coming from one or more virtual talker locations within the first sector. The first output soundfield signal may comprise a first-order ambisonic output signal. The first-order ambisonic output signal typically comprises an omnidirectional output channel and at least two directional output channels, wherein the at least two directional output channels are associated with at least two directions which are orthogonal with respect to one another (e.g. the x-axis and the y-axis).

The conference multiplexer is typically configured to place a plurality of input soundfield signals at a corresponding plurality of sectors within the conference scene. The plurality of sectors may be non-overlapping. In particular, the conference multiplexer may be configured to place a second input soundfield signal at a second sector of the conference scene. The first and the second sectors may be positioned at opposite sides of an axis along the front and the back of the listener (e.g. the x-axis). Overall, the conference multiplexer may be configured to transform the plurality of input soundfield signals into a plurality of output soundfield signals, such that for the listener the plurality of output soundfield signals appears to be emanating from virtual talker locations within the plurality of sectors, respectively.

Furthermore, the conference multiplexer may be configured to multiplex the plurality of output soundfield signals into a multiplexed soundfield signal, such that for the listener spatial cues of the multiplexed soundfield signal are the same as spatial cues of the plurality of output soundfield signals. In other words, the conference multiplexer may be configured to combine a plurality of output soundfields signals in order to generate a single multiplexed soundfield signal which comprises the spatial information of each of the plurality of output soundfield signals.

The transform which is used to transform the first input soundfield signal into the first output soundfield signal may comprise a direction-of-arrival (DOA) analysis of the soundfield indicated by the first input soundfield signal, thereby yielding an estimated angle of arrival of the soundfield at the first soundfield endpoint. The DOA analysis may estimate the angle or arrival of the dominant talker within the soundfield.

The transform may comprise a mapping of the estimated angle to the first sector, thereby yielding a remapped angle. For this purpose, the mapping may make use of a mapping function. The mapping function is preferably conformal and/or continuous, such that for any pair of adjacent estimated angles the pair of remapped angles is also adjacent. By doing this, it can be ensured that the remapping does not introduce discontinuities when a talker moves at the first soundfield endpoint. The mapping function may comprise $$\theta' = \theta_1 + \frac{\Delta_1}{2}\cos(\theta),$$

with $\theta_1$ being a mid angle of the first sector, with $\Delta_1$ being the first angular width of the first sector, with $\theta$ being the estimated angle and with $\theta'$ being the remapped angle. The transform may further comprise the determining of the first output soundfield signal based on the input soundfield signal and based on the remapped angle.

The first input soundfield signal may comprise an omnidirectional component W, an X-directional component X and a Y-directional component Y. The estimated angle $\theta$ may be determined as $$\theta = \mathrm{atan2}\left(\mathrm{real}\left(\frac{Y}{W}\right), \mathrm{real}\left(\frac{X}{W}\right)\right),$$

with a tan 2 being the four-quadrant arctangent function.

The transform may comprise a time domain-to-frequency domain transform of the first input soundfield signal. The time domain-to-frequency domain transform may comprise one or more of: a Fast Fourier Transform, a Short Term Fourier Transform, a Modified Discrete Fourier Transform, a Quadrature Mirror Filter bank. Furthermore, the time domain-to-frequency domain transform may comprise a subband grouping of one or more frequency bins into a subband. The subbands of the plurality of subbands may have frequency ranges which follow a psychoacoustic scale, e.g. a logarithmic scale or a Bark scale.

As such, the direction-of-arrival analysis of the soundfield may be performed in the frequency domain, thereby yielding a plurality of estimated angles of arrival for a corresponding plurality of subbands. This may be used to distinguish between different talker locations within the first soundfield signal. The transform may comprise a mapping of the plurality of estimated angles to the first sector, thereby yielding a corresponding plurality of remapped angles. The mapping of each angle may be performed using the above-mentioned mapping function. The first output soundfield signal may be determined based on the plurality of remapped angles.

According to a further aspect, a method for placing a first input soundfield signal originating from a first soundfield endpoint into a 2D or 3D conference scene which is to be rendered to a listener is described. The first input soundfield signal is indicative of a soundfield captured by the first soundfield endpoint. The method may comprise setting up the conference scene comprising a plurality of talker locations at different angles around the listener. Furthermore, the method may comprise providing a first sector within the conference scene, wherein the first sector has a first angular width and wherein the first angular width is greater than zero. In addition, the method may comprise transforming the first input soundfield signal into a first output soundfield signal, such that for the listener the first output soundfield signal appears to be emanating from (one or more virtual talker locations within) the first sector.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined.

In particular, the features of the claims may be combined with one another in an arbitrary manner.

SHORT DESCRIPTION OF THE FIGURES

The invention is explained below in an exemplary manner with reference to the accompanying drawings, wherein FIG. 1a shows a block diagram of an example centralized audio conference system;

DETAILED DESCRIPTION

As outlined in the introductory section, it is desirable to provide a multi-party audio conference system which allows to overlay a plurality of audio signals originating from a plurality of different terminals or endpoints of the audio conference system, such that a listener is provided with spatial cues regarding the different talkers at the plurality of different terminals. The present document addresses the particular challenges of soundfield endpoints which are configured to capture a soundfield using e.g. a microphone array. A soundfield endpoint is typically configured to provide spatial information regarding the location of one or more talkers around the soundfield endpoint. It is desirable to provide a listener within a soundfield conference system with some or all of this spatial information, even if the conference system comprises a plurality of soundfield endpoints and/or other monophonic endpoints.

Figure 1A:
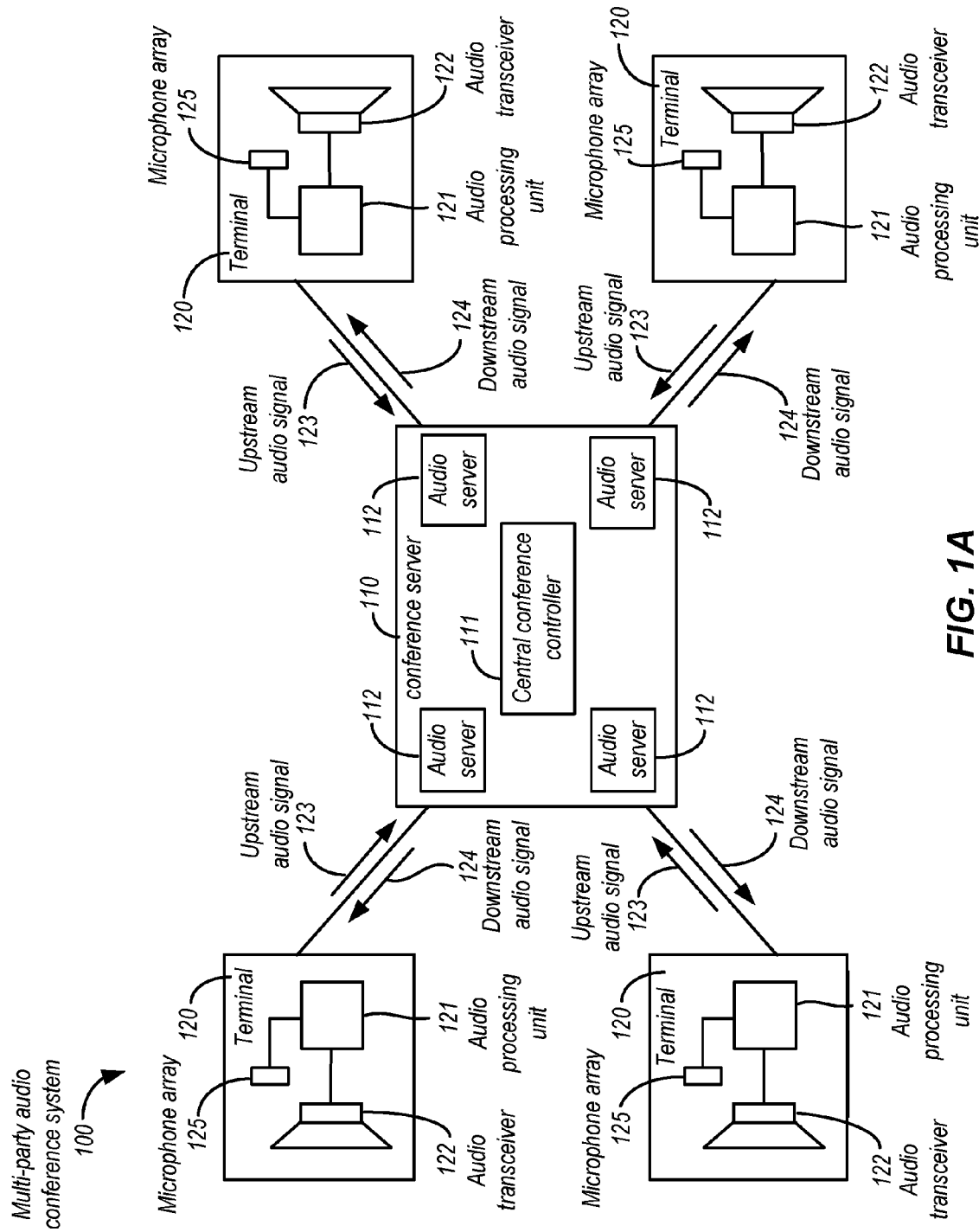
FIG. 1b shows a block diagram of an example de-centralized audio conference system.

FIG. 1a illustrates an example multi-party audio conference system 100 with a centralized architecture. A centralized conference server 110 receives a plurality of upstream audio signals 123 from a respective plurality of terminals 120. An upstream audio signal 123 is typically transmitted as an audio stream, e.g. a bitstream. By way of example, an upstream audio signal 123 may be encoded as a G.711, a G722.2 (AMR-WB), a MPEG2 or a MPEG4 audio bitstream. In case of a monophonic terminal 120, the upstream audio signal 123 is typically a mono audio signal. In case of a soundfield terminal 120, the upstream audio signal 123 may be a multi-channel audio signal (e.g. a 5.1 or a 7.1 multi-channel audio signal). Alternatively, the upstream audio signal 123 may be an ambisonic signal, e.g. a first-order ambisonic signal which is also referred to as the B-format.

In the present document, the components W, X, and Y may be used to represent a multichannel audio object or soundfield in the sense that it represents an acoustical situation that was, or could have been captured by a set of microphones, and describes the signal properties of the soundfield over space time and frequency around a central location. Such signals can be linearly transposed or transformed to other spatial representations. Furthermore, any audio signal can be transformed between domains such as time and frequency or subband representation. For the purpose of this disclosure, the components WXY are generally used to refer to a soundfield object that is either captured or created, such as through manipulations presented in this document. It is noted that the aspects described in the present document can be extended beyond first order horizontal soundfield representation, and could be applied to spatial formats with larger numbers of channels (higher order) and also periphonic (azimuth and elevation) capture of the soundfield. The use of WXY as a general signal label is used to convey the idea of a soundfield object, and in specific equations, the use of W, X and Y represents specific defined signals that can be derived from any soundfield representation. In this way, the equations herein are embodiments of potential manipulations of component soundfield systems.

It should be noted that soundfields may be encoded and transported across a communication system. A layered encoding scheme for soundfields (in particular for first-order ambisonic audio signals) is describe e.g. in U.S. Application Nos. 61/703,857 and 61/703,855 the disclosures of which are incorporated by reference.

The centralized conference server 110 (e.g. the audio servers 112 comprised within the conference server 110) may be configured to decode and to process the upstream audio streams (representing the upstream audio signals 123), including optional metadata associated with upstream audio streams.

The conference server 110 may e.g. be an application server of an audio conference service provider within a telecommunication network. As indicated above, a terminal 120 may be a monophonic terminal and/or a soundfield terminal. The terminals 120 may e.g. be computing devices, such as laptop computers, desktop computers, tablet computers, and/or smartphones; as well as telephones, such as mobile telephones, cordless telephones, desktop handsets, etc. A soundfield terminal typically comprises a microphone array to capture the soundfield.

The conference server 110 comprises a central conference controller 111 configured to combine the plurality of upstream audio signals 123 to form an audio conference. The central conference controller 111 may be configured to place the plurality of upstream audio signals 123 at particular locations (also referred to as talker locations) within a 2D or 3D conference scene and to generate information regarding the arrangement (i.e. the locations) of the plurality of upstream audio signals 123 within the conference scene.

Furthermore, the conference server 110 comprises a plurality of audio servers 112 for the plurality of terminals 120, respectively. It should be noted that the plurality of audio servers 112 may be provided within a single computing device/digital signal processor. The plurality of audio servers 112 may e.g. be dedicated processing modules within the server or dedicated software threads to service the audio signals for the respective plurality of terminals 120. Hence, the audio servers 112 may be "logical" entities which process the audio signals in accordance to the needs of the respective terminals 120. An audio server 112 (or an equivalent processing module or thread within a combined server) receives some or all of the plurality of upstream audio signals 123 (e.g. in the form of audio streams), as well as the information regarding the arrangement of the plurality of upstream audio signals 123 within the conference scene. The information regarding the arrangement of the plurality of upstream audio signals 123 within the conference scene is typically provided by the conference controller 111 which thereby informs the audio server 112 (or processing module/thread) on how to process the audio signals. Using this information, the audio server 112 generates a set of downstream audio signals 124, and/or corresponding metadata, which is transmitted to the respective terminal 120, in order to enable the respective terminal 120 to render the audio signals of the participating parties in accordance to the conference scene established within the conference controller 111. The set of downstream audio signals 124 is typically transmitted as a set of downstream audio streams, e.g. bitstreams. By way of example, the set of downstream audio signals 124 may be encoded as G.711, G722.2 (AMR-WB), MPEG2 or MPEG4 or proprietary audio bitstreams. The information regarding the placement of the downstream audio signals 124 within the conference scene may be encoded as metadata e.g. within the set of downstream audio streams. Hence, the conference server 110 (in particular the audio server 112) may be configured to encode the set of downstream audio signals 124 into a set of downstream audio streams comprising metadata for rendering the conference scene at the terminal 120. A further example for the set of downstream audio signals 124 may be a multi-channel audio signal (e.g. a 5.1 or a 7.1 audio signal) or an ambisonic signal (e.g. a first-order ambisonic signal in B-format) representing a soundfield. In these cases, the spatial information regarding the talker locations is directly encoded within the set of downstream audio signals 124.

As such, the audio servers 112 may be configured to perform the actual signal processing (e.g. using a digital signal processor) of the plurality of upstream audio streams and/or the plurality of upstream audio signals, in order to generate the plurality of downstream audio streams and/or the plurality of downstream audio signals, and/or the metadata describing the conference scene. The audio servers 112 may be dedicated to a corresponding terminal 120 (as illustrated in FIG. 1a). Alternatively, an audio server 112 may be configured to perform the signal processing for a plurality of terminals 120, e.g. for all terminals 120.

It should be noted that the upstream audio signal 123 of a terminal 120 may also be referred to as a talker audio signal 123, because it comprises the audio signal which is generated by the conference participant that is talking at the terminal 120, e.g. talking into a microphone of the terminal 120. In a similar manner, the set of downstream audio signals 124 which is sent to the terminal 120 may be referred to as a set of auditor audio signals 124, because the set 124 comprises the plurality of audio signals which the participant at the terminal 120 listens to, e.g. using headphones or loudspeakers.

The set of downstream audio signals 124 for a particular terminal 120 is generated from the plurality of upstream audio signals 123 using the central conference controller 111 and the audio server 112, e.g. the audio server 112 (or the processing module or the software thread) for the particular terminal 120. The central conference controller 111 and the audio server 112 generate an image of the 2D or 3D conference scene as it is to be perceived by a conference participant at the particular terminal 120. If there are M terminals 120 connected to the conference server 110, then the conference server 110 may be configured to arrange M groups of (M−1) upstream audio signals 123 within M 2D or 3D conference scenes (M being an integer with M>2, e.g. M>3,4,5,6,7,8,9,10). More precisely, the conference server 110 may be configured to generate M conference scenes for the M terminals 120, wherein for each terminal 120 the remaining (M−1) other upstream audio signals 123 are arranged within a 2D or 3D conference scene.

By way of example, the conference server 110 may make use of a master conference scene which describes the arrangement of the M conference participants within a 2D or 3D spatial arrangement. The conference server 110 may be configured to generate a different perspective of the master conference scene for the M terminals 120, respectively. By doing this, it can be ensured that all of the conference participants have the same relative view of where the other conference participants are being placed.

A terminal 120 receives its terminal specific set of downstream audio signals 124 (and the corresponding metadata) and renders the set of downstream audio signals 124 via the audio transceiver 122 (e.g. headphones or loudspeakers). For this purpose, the terminal 120 (e.g. an audio processing unit 121 comprised within the terminal 120) may be configured to decode a set of downstream audio bitstreams, in order to extract the downstream audio signals and/or the corresponding metadata. Alternatively or in addition, the terminal 120 may be configured to process ambisonic signals, in order to render a soundfield. In an embodiment, the audio processing unit 121 of the terminal 120 is configured to generate a mixed binaural audio signal for rendering by the audio transceiver 122, wherein the mixed binaural audio signal reflects the terminal specific conference scene designed at the conference server 110 for this terminal 120. By way of example, the audio processing unit 121 may be configured to analyze the received metadata and to place the received set of downstream audio signals 124 into the terminal specific conference scene. Alternatively, the audio processing unit 121 may process the received ambisonic signal. As a result, the conference participant perceives a binaural audio signal which gives the conference participant at the terminal 120 the impression that the other participants are placed at specific locations within a conference scene.

The generation of a binaural audio signal for the set of downstream audio signals 124 may be performed by processing each (mono) downstream audio signal through a spatialisation algorithm. Such an algorithm could be the filtering of the samples of the downstream audio signal using a pair of head related transfer functions (HRTFs), in order to provide a left and right ear signal. The HRTFs describe the filtering that would have naturally occurred between a sound source (of the downstream audio signal) positioned at a particular location in space and the ears of the listener. The HRTFs include all the cues for the binaural rendering of the sound, such as interaural time difference, interaural level difference and spectral cues. The HRTFs depend on the location of the sound source (i.e. on the talker location of the downstream audio signal). A different, specific pair of HRTFs may be used for each specific location within the conference scene. Alternatively, the filtering characteristics for a particular location can be created by interpolation between adjacent locations that HRTFs are available for. Hence, the terminal 120 may be configured to identify the talker location of a downstream audio signal from the associated metadata. Furthermore, the terminal 120 may be configured to determine an appropriate pair of HRTFs for the identified talker location. In addition, the terminal 120 may be configured to apply the pair of HRTFs to the downstream audio signal, thereby yielding a binaural audio signal which is perceived as coming from the identified talker location. If the terminal 120 receives more than one downstream audio signal within the set of downstream audio signals 124, the above processing may be performed for each of the downstream audio signals and the resulting binaural signals may be overlaid, to yield a combined binaural signal. In particular, if the set of downstream audio signals 124 comprises an ambisonic signal representing a soundfield, the binaural processing may be performed for some or all components of the ambisonic signal.

By way of example, in case of first order ambisonic signals, signals originating from mono endpoints may be panned into respective first order ambisonic (WXY) soundfields (e.g. with some additional reverb). Subsequently, all soundfields may be mixed together (those from panned mono endpoints, as well as those from soundfields captured with microphone arrays), thereby yielding a multiplexed soundfield. A WXY-to-binaural renderer may be used to render the multiplexed soundfield to the listener. Such a WXY-to-binaural renderer typically makes use of a spherical harmonic decomposition of HRTFs from all angles, taking the multiplexed WXY signal itself (which is a spherical harmonic decomposition of a soundfield) as an input.

It should be noted that alternatively or in addition to the generation of a mixed binaural audio signal, the terminal 120 (e.g. the audio processing unit 121) may be configured to generate a surround sound (e.g. a 5.1 or a 7.1 surround sound) signal, which may be rendered at the terminal 120 using appropriately placed loudspeakers 122. Furthermore, the terminal 120 may be configured to generate a mixed audio signal from the set of downstream audio signals 124 for rendering using a mono loudspeaker 122.

Figure 1B:
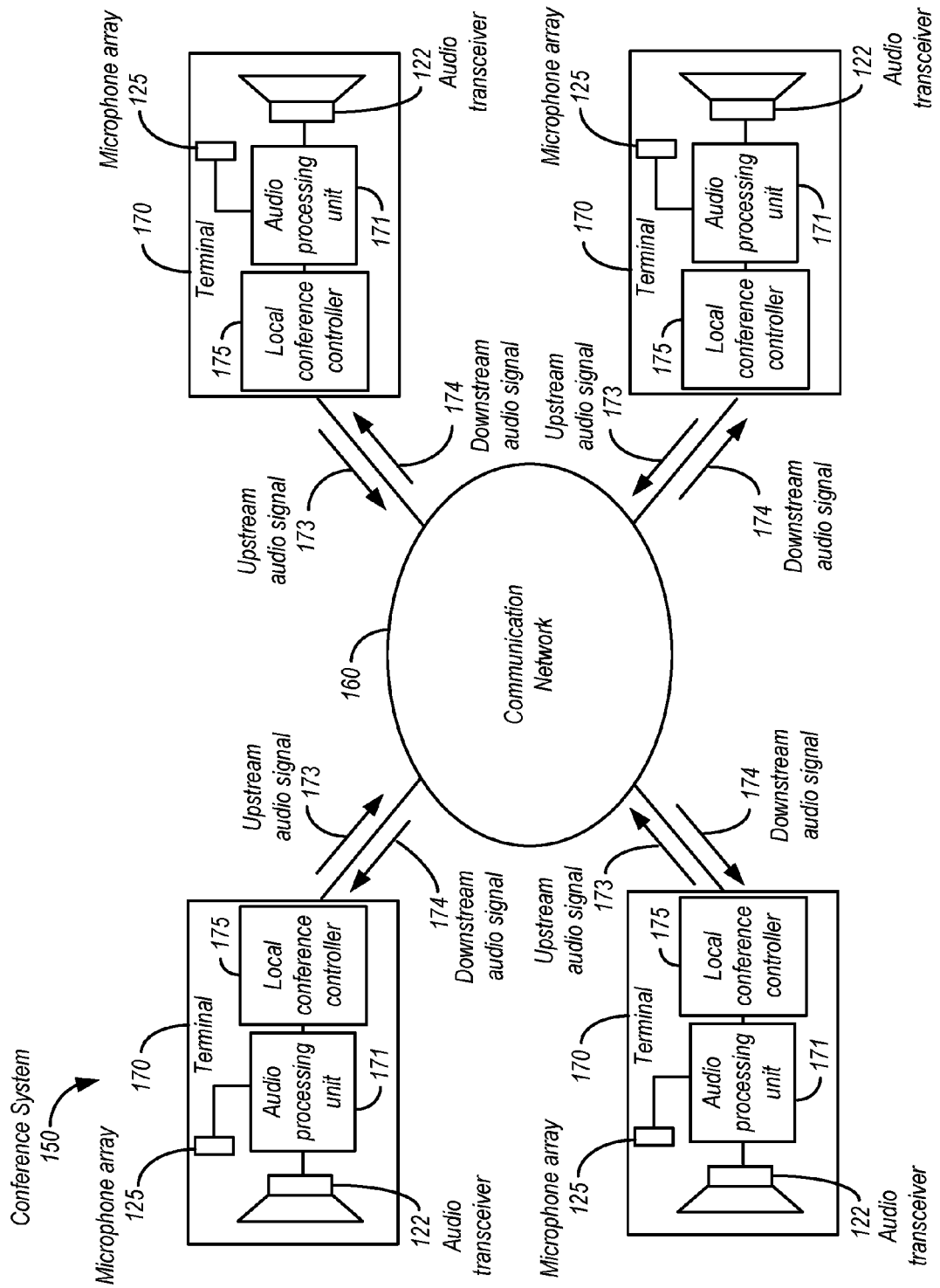

FIG. 1a illustrates a 2D or 3D conference system 110 with a centralized architecture. 2D or 3D audio conferences may also be provided using a distributed architecture, as illustrated by the conference system 150 of FIG. 1b. In the illustrated example, the terminals 170 comprise a local conference controller 175 configured to mix the audio signals of the conference participants and/or to place the audio signals into a conference scene. In a similar manner to the central conference controller 111 of the centralized conference server 110, the local conference controller 175 may be limited to analyzing the signaling information of the received audio signals in order to generate a conference scene. The actual manipulation of the audio signals may be performed by a separate audio processing unit 171.

In a distributed architecture, a terminal 170 is configured to send its upstream audio signal 173 (e.g. as a bitstream) to the other participating terminals 170 via a communication network 160. The terminal 170 may be a monophonic or a soundfield terminal. The terminal 170 may use multicasting schemes and/or direct addressing schemes of the other participating terminals 170. Hence, in case of M participating terminals 170, each terminal 170 receives up to (M−1) downstream audio signals 174 (e.g. as bitstreams) which correspond to the upstream audio signals 173 of the (M−1) other terminals 170. The local conference controller 175 of a receiving terminal 170 is configured to place the received downstream audio signals 174 into a 2D or 3D conference scene, wherein the receiving terminal 170 (i.e. the listener at the receiving terminal 170) is typically placed in the center of the conference scene. The audio processing unit 171 of the receiving terminal 170 may be configured to generate a mixed binaural signal from the received downstream audio signals 174, wherein the mixed binaural signal reflects the 2D or 3D conference scene designed by the local conference controller 175. The mixed binaural signal may then be rendered by the audio transceiver 122. Alternatively or in addition, the audio processing unit 171 of the receiving terminal 170 may be configured to generate a surround sound signal to be rendered by a plurality of loudspeakers.

In an embodiment, the mixing may be performed in the ambisonic domain (e.g. at a central conference server). As such, the downstream audio signal to a particular terminal comprises a multiplexed ambisonic signal representing the complete conference scene. Decoding to binaural headphone feeds or to loudspeaker feeds may be done at the receiving terminal as a final stage.

It should be noted that the centralized conference system 100 and the decentralized conference system 150 may be combined to form hybrid architectures. By way of example, the terminal 170 may also be used in conjunction with a conference server 110 (e.g. while other users may use terminals 120). In an example embodiment, the terminal 170 receives a set of downstream audio signals 124 (and corresponding metadata) from the conference server 110. The local conference controller 175 within the terminal 170 may set up the conference scene provided by the conference server 110 as a default scene. In addition, a user of the terminal 170 may be enabled to modify the default scene provided by the conference server 110.

In the following, reference will be made to the centralized conference architecture 100 and terminal 120. It should be noted, however, that the teachings of this document are also applicable to the de-centralized architecture 150, as well as to hybrid architectures.

As outlined above, the present document addresses the technical problem of building a 2D or 3D conference scene for a multi-party conference system 100 which comprises one or more soundfield endpoints 120. The conference scene may be build within an endpoint 120 of the conference system 100 and/or within the conference server 110 of the conference system 100. The conference scene should allow a listener to identify the different participants of the multi-party conference, including a plurality of participants at the one or more soundfield endpoints 120. For this purpose one may make use of one or more of the following approaches (stand alone or in combination):

temporal multiplexing—in which a different soundfield is heard by the listener from time to time, or in which soundfields are mixed together with time-varying gains.

spatial multiplexing—in which multiple soundfields may be heard at once, each appearing to come from a different characteristic location in the listener's virtual space (i.e. within the 2D or 3D conference scene).

a single room—in which multiple soundfields are combined in such a way that the listener appears to be sitting in a virtual room with all of the other meeting participants.

It should be noted that e.g. temporal and spatial multiplexing may be used together to form a spatio-temporal soundfield multiplexing approach.

In the following, a spatial multiplexing approach for combining soundfields in a soundfield teleconferencing system is described. As outlined above, the different endpoints 120 of a conference system 100 generate respective upstream audio signals 123 which are to be placed within a 2D or 3D conference scene. In case of a monophonic endpoint 120, the upstream audio signal 123 may be a single channel (mono) audio signal. In case of a soundfield endpoint 120, the upstream audio signal 123 may be a multi-channel audio signal. Examples for such a multi-channel audio signal are 5.1 or 7.1 audio signals. Alternatively, an isotropic multi-channel format may be used to represent the soundfield captured by the soundfield endpoint 120. An example for such an isotropic multi-channel format is the first-order ambisonic sound format (also referred to as the ambisonic B-format), where sound information is encoded into four channels: W, X, Y and Z. The W channel is a non-directional mono component of the signal, corresponding e.g. to the output of an omni-directional microphone of the soundfield endpoint 120. The X, Y and Z channels are the directional components in three orthogonal dimensions. The X, Y and Z channels correspond e.g. to the outputs of three figure-of-eight microphones, facing forward, to the left, and upward respectively (with respect to the head of a listener).

In the following, it is assumed that the soundfields of soundfield endpoints 120 (i.e. the upstream audio signals 123) are represented in a compact isotropic multichannel format that can be decoded for playback over an arbitrary speaker array, e.g. in the first-order horizontal B-format (which corresponds to the first-order ambisonic sound format with only the channels W, X and Y). This format will be denoted as the S-format. It should be noted, however, that the spatial multiplexing approaches described in the present document are also applicable to other soundfield representations (e.g. to other multi-channel audio signal formats).

Figure 2:
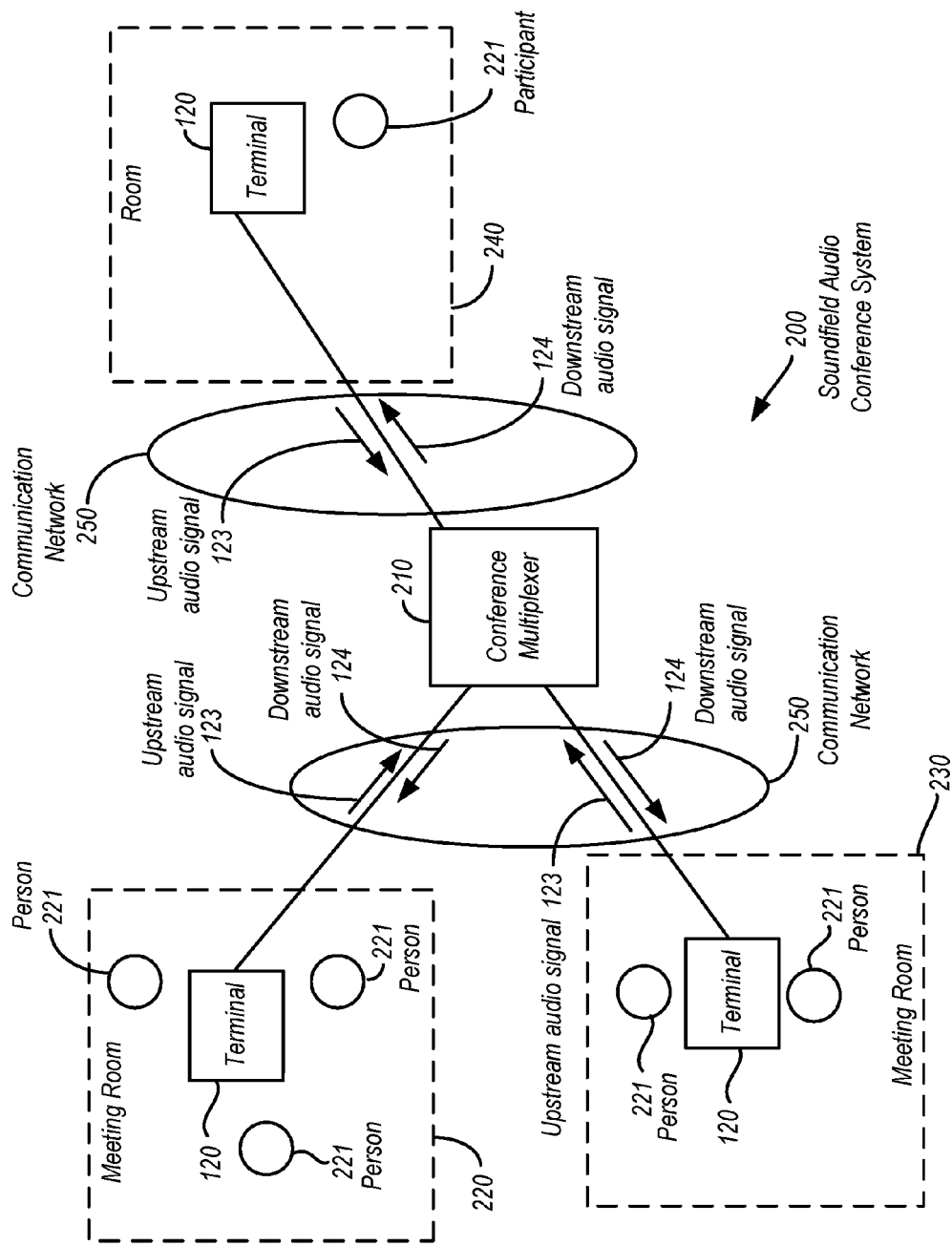
FIG. 2 illustrates a block diagram of an example audio conference system comprising two soundfield endpoints.

FIG. 2 shows a block diagram of an example soundfield audio conference system 200. The system 200 comprises two example soundfield endpoints 120 and a further example monophonic endpoint 120 (for the listening party in the illustrated example). It should be noted that the endpoints 120 may have the functionality of endpoints 120 of FIG. 1a and/or endpoints 170 of FIG. 1b. A first soundfield endpoint 120 is placed in a first meeting room 220 with three participants 221, and a second soundfield endpoint 120 is placed in a second meeting room 230 with two participants 221. In other words, the conferencing system 200 takes input from a plurality of meeting rooms 220, 230, exemplified by room 220, in which three people 221 sit around a table on which a telephony device 120 including a soundfield microphone is placed, and room 230 in which two people 221 sit opposite each other across a table also having a soundfield telephony device 120. Soundfields from this plurality of endpoints 120 are transmitted across a communication network 250 to a conference multiplexer 210 (e.g. a spatial multiplexer), which produces an output soundfield (e.g. a set of downstream audio signals 124). The conference multiplexer 210 may correspond to the central conference server 110 of FIG. 1a. The output soundfield generated by the conference multiplexer 210 may be transmitted across the communication network 250 to a listening endpoint 120 (in room 240). The listening endpoint 120 may reproduce the soundfield over a speaker array and/or may perform binaural virtualization for rendering over headphones to a listener.

Figure 3:
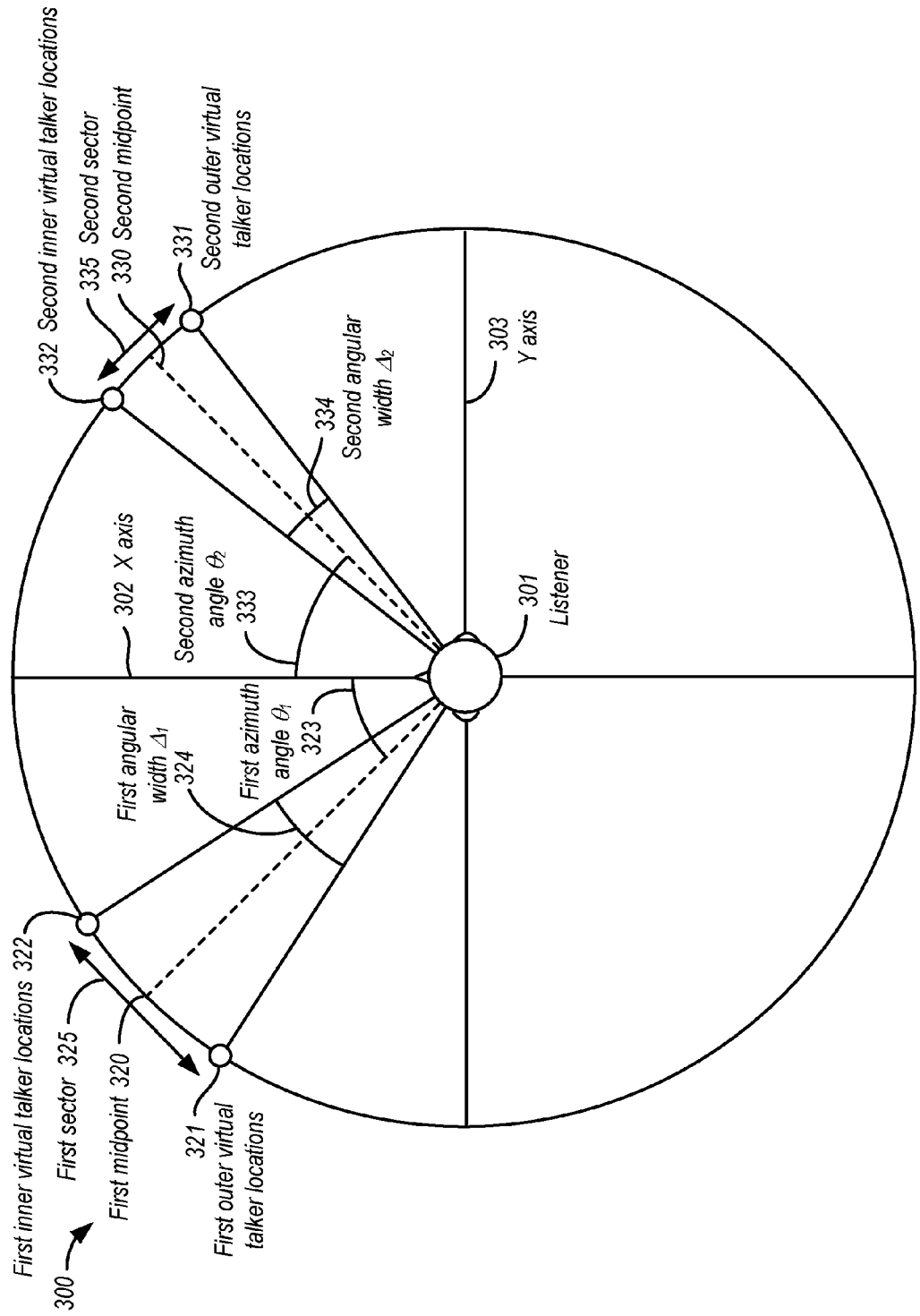
FIG. 3 illustrates an example conference scene for an audio conference comprising a plurality of soundfield endpoints.

In the present document, it is proposed to place each of the plurality of soundfields from the meetings rooms 220, 230 within a different sector of a sphere around the listener. In other words, it is proposed to project the plurality of soundfields onto a plurality of different sectors of a sphere around the listener, respectively. The projection of the soundfield onto the sector of the sphere should be such that participants 221 (i.e. talkers) within a meeting room 220, 230 are projected onto different locations within the sector. This is illustrated for the 2D (two dimensional) case in FIG. 3. FIG. 3 shows an example 2D conference scene 300 comprising talker locations which are positioned on a circle around the listener 301, wherein the listener 301 is positioned within the center of the conference scene 300 (i.e. within the center of the circle). FIG. 3 shows the X direction or X axis 302 (in front and in the back of the listener 301) and the Y direction or Y axis 303 (towards the left and towards the right of the listener 301). Furthermore, FIG. 3 shows a first sector 325 and a second sector 335 of the conference circle. The first sector 325 of the conference circle comprises a first midpoint 320 and first outer and inner virtual talker locations 321, 322 (at the respective edges of the first sector 325), wherein the second sector 335 of the conference circle comprises a second midpoint 330 and second outer and inner virtual talker locations 331, 332 (at the respective edges of the second sector 335). The first midpoint 320 is located at a first azimuth angle $\theta_1$ 323 from the X axis 302 and the second midpoint 330 is located at a second azimuth angle $\theta_2$ 333 from the X axis 302 (preferably at opposite sides of the X axis 302). The first sector 325 has a first angular width $\Delta_1$ 324 from the first outer talker location 321 to the first inner virtual talker location 322, and the second sector 335 has a second angular width $\Delta_2$ 334 from the second outer virtual talker location 331 to the second inner virtual talker location 332.

The conference multiplexer 210 is configured to map the soundfield from the first meeting room 220 to the first sector 325 and the soundfield from the second meeting room 230 to the second sector 335 of the conference scene 300. As a result of the processing performed by the conference multiplexer 210, the listener 301 may perceive the soundfield from each endpoint 120 (i.e. from each meeting room 220, 230) to be incident from a particular sector 325, 335. In FIG. 3, the soundfield from the first meeting room 220 is perceived to be incident from the first sector 325 with a first angular width $\Delta_1$ 324 centered on the first azimuth angle $\theta_1$ 323 left of the centre front. Similarly, the soundfield from the second meeting room 230 is perceived to be incident from the second sector 335 with a second angular width $\Delta_2$ 334 centered on the second azimuth angle $\theta_2$ 333 right of the centre front. These perceived images of the soundfields may be generated by respective pairs of virtual source locations 321, 322 and 331, 332 (also referred to as virtual talker locations). The conference multiplexer 210 may be configured to determine the respective pairs of audio signals which are to be rendered at the pairs of virtual source locations 321, 322 and 331, 332, based on the respective soundfields from the first and second meeting rooms 220, 230.

Figure 4:
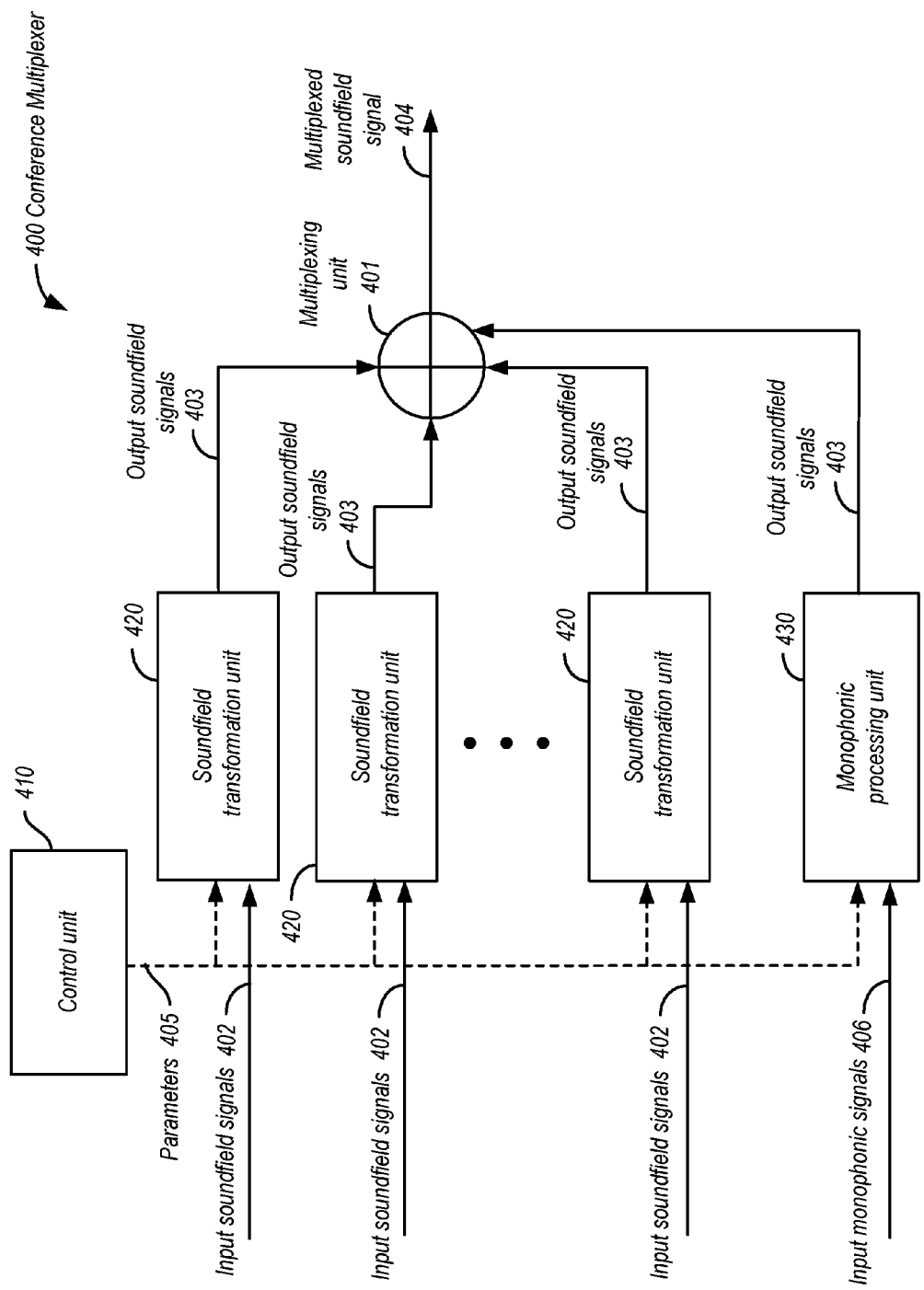
FIG. 4 shows a block diagram of an example spatial multiplexing unit for a soundfield audio conference system.

FIG. 4 shows an internal block diagram of an example conference multiplexer 400 (e.g. the multiplexer 210 of FIG. 2). The conference multiplexer 400 comprises one or more soundfield transformation units 420 which are configured to process respective one or more input soundfield signals 402 (e.g. the upstream audio signals 123). A soundfield transformation unit 420 may e.g. be comprised within an audio server 112 (see FIG. 1a) or an audio processing unit 171 (see FIG. 1b). A soundfield transformation unit 420 may be configured to perform a soundfield transformation of the input soundfield signal 402, wherein the soundfield transformation changes the spatial characteristics of the input soundfield signal 402, thereby yielding an output soundfield signal 403. The output soundfield signals 403 may be mixed together using a multiplexing unit 401 to produce a multiplexed soundfield signal 404 (e.g. the set of downstream audio signals 124) which represents the conference scene. The multiplexing unit 401 may be configured to add a plurality of output soundfield signals 403 to yield the multiplexed soundfield signal 404. The parameters 405 of the soundfield transformations may be controlled by a control unit 401, wherein the control unit 401 may be configured to distribute the input soundfield signals 402 around the listener 301 of the conference scene 300. By way of example, the control unit 401 may be comprised within the conference controller 111 of FIG. 1a or within the local conference controller 171 of FIG. 1b.

It should be noted that the conference multiplexer 400 may also comprise one or more monophonic processing units 430 which are configured to process an input monophonic signal 406 (e.g. the upstream audio signal 123) to produce an output soundfield signal 403. In particular, the monophonic processing units 430 may be configured to process the input monophonic signal 406 such that it is perceived by the listener 301 as coming from a particular talker location within the conference scene 300. The multiplexing unit 401 may be configured to include the output soundfield signals 403 from the one or more monophonic processing units 430 into the multiplexed soundfield signal 404.

A preferred embodiment of the control unit 410 adjusts the parameters 405 of the soundfield transformation units 420 such that the output soundfield signals 403 are distributed across the front sector of the perceived angular space of the listener 301 (e.g. of a binaural listener). The angular space which is attributed to the different endpoints may vary, e.g. in order to emphasize some endpoints with respect to others. The front sector may have a range of 45°-180°. By way of example, each endpoint may subtend an angle of 10° to 45°. The subtending angle may be limited, e.g. based on the mapping function used for mapping a soundfield to the angular space around the listener 301. If the multiplexed soundfield signal 404 is to be rendered over a speaker array with no obvious front direction, the control unit 410 may be configured to choose to distribute the output soundfield signals 403 around the full 360° angular space of the conference scene 300.

As such, the control unit 410 may be configured to assign a first sector 325 of the conference scene 300 to a first input soundfield signal 402 (coming e.g. from the first meeting room 220). In particular, the control unit 410 may be configured to generate control data 405 (e.g. parameters) for a first soundfield transformation unit 402 which processes the first input soundfield signal 402 to project the first input soundfield signal 402 onto the first sector 325. The control data 405 is e.g. indicative of the first azimuth angle $\theta_1$ 323 and the first angular width $\Delta_1$ 324 of the first sector 325. The first soundfield transformation unit 402 may be configured to process the first input soundfield signal 402 to generate a first output soundfield signal 403 which is perceived by the listener 301 as emanating from the first sector 325.

In particular, the soundfield transformation unit 420 may be configured to decode the input soundfield signal 402 as if to render the input soundfield signal 402 over an array consisting of two speakers, wherein the two speakers are placed on either side of the listener's head (aligned with the +Y, −Y axis 303 of FIG. 3). In other words, the soundfield transformation unit 420 may be configured to project the (three dimensional) input soundfield signal 402 onto a subspace having a dimension which is reduced with respect to the dimension of the input soundfield signal 402. In particular, the soundfield transformation unit 420 may be configured to project the input soundfield signal 402 onto the Y axis 303. In other words, the talker locations of the participants 221 within a meeting room 220 may be projected onto a straight line (e.g. onto the Y axis 303). The two-dimensional soundfield signal may be rendered by an array of two speakers (e.g. a left speaker on the left side on the Y axis 303 of the listener 301 and a right speaker on the right side on the Y axis 303 of the listener 301). The two-dimensional soundfield signal may be referred to as an intermediate soundfield signal. It should be noted that alternatively the input soundfield signal 402 may be projected onto a different straight line, i.e. a different pair of opposite speaker locations may be used (e.g. at angles (0°,180° or)(+45°,−135°.

Furthermore, the soundfield transformation unit 420 may be configured to re-encode the intermediate soundfield signal (i.e. the two speaker feeds on the Y axis 303) into the output soundfield signal 403 which emanates from the first sector 325 defined by the azimuth angle $\theta_1$ 323 and the angular width $\Delta_1$ 324. The left and right speakers which render the intermediate soundfield signal may be viewed as plane wave sources. The soundfield transformation unit 420 may be configured to transform the intermediate soundfield signal, such that the output soundfield signal 403 is perceived by the listener 301 as if the left and right speaker feeds emanate from respective plane wave sources at the first inner and outer talker locations 321, 322 of the sector 325. In other words, the two speaker feeds may be re-encoded into the output soundfield signal 403, by assuming that the two speaker feeds come from two plane wave speakers at two different angles $\theta_1 \pm \Delta_1/2$. In yet other words, the intermediate soundfield signal may be panned to plane wave sources 321 and 322 at azimuth angles $\theta_1 \pm \Delta_1/2$.

Overall, the soundfield transformation unit 420 may be configured to project the input soundfield signal 402 onto a sector 325 of the conference scene 300. The output soundfield signal 403 is perceived by the listener 301 as emanating from the sector 325. In particular, the output soundfield signal 403 is indicative of two speaker signals which are rendered by two plane wave sources at the locations 321, 322 on the edges of the sector 325.

The definition of how to decode the input soundfield signal 402 into two speaker feeds (i.e. into the intermediate soundfield signal) for two plane wave sources on the Y axis 303, and how to re-encode the two speaker feeds into the output soundfield signal 403 depends on the mathematical basis chosen for representing the soundsfields. When the basis chosen is a first order horizontal B-format with components designated as W, X, and Y, the decoding of the two speaker feeds L, R may be achieved using the following equation $$\begin{bmatrix} L \\ R \end{bmatrix} = \begin{bmatrix} 0.5 & 0 & 0.5 \\ 0.5 & 0 & -0.5 \end{bmatrix} \begin{bmatrix} W \\ X \\ Y \end{bmatrix}.$$

Using this same format, encoding of the two speaker feeds L, R at angles $\theta_L$ and $\theta_R$ may be defined as $$\begin{bmatrix} W' \\ X' \\ Y' \end{bmatrix} = \begin{bmatrix} 1 & 1 \\ \cos(\theta_L) & \cos(\theta_R) \\ \sin(\theta_L) & \sin(\theta_R) \end{bmatrix} \begin{bmatrix} L \\ R \end{bmatrix}.$$

In case of the first sector 325 of FIG. 3, the angles $\theta_L$ and $\theta_R$ may be $\theta_L = \theta_1 - \Delta_1/2$ and $\theta_R = \theta_1 + \Delta_1/2$.

As such, a conference multiplexer 400 has been described which is configured to map one or more soundfields of one or more soundfield endpoints 120 to respective sectors 325, 335 of a conference scene 300, using a linear transformation. The conference multiplexer 400 may be configured to place a plurality of soundfields within a 2D conference scene 300, in an alternating manner on the left side and on the right side of the X axis 302 of the conference scene 300. The linear transformation comprises a sequence of projections of the soundfield, notably a first projection onto the Y axis 303 of the conference scene 300 and a subsequent projection onto a sector 325, 335 of the conference scene 300. In other words, the linear transformation (also referred to as a stereo panning approach) proceeds by taking an input soundfield signal 402 and by decoding the input soundfield signal 402 to a pair of channels (L, R). This pair of channels is then rendered in some way within the desired perceived soundfield. Overall, the input soundfield signal 402 is collapsed to a subregion of the available listening space.

The above mentioned transformations or projections have been described for the particular example of a first-order horizontal B format representation of the upstream audio signals 123. It should be noted that the above mentioned soundfield transformation may be performed for other signal representations (e.g. other multi-channel signal representations) in an analogous manner.

The above mentioned sequence of projections may lead to a situation, where a plurality of participants 221 within a meeting room 220 is projected onto the same talker location within a sector 325 of the conference scene 300. In the following, a soundfield transformation scheme is described which allows to identify the different participants 221 (in particular, to identify their talker location) within a meeting room 220 and to map the participants 221 to different talker locations within the sector 325 of the conference scene 300. The mapping of the participants 221 described in the present document is particularly beneficial, as it avoids discontinuities when mapping the complete 360° angular space to the sector 325.

Figure 5A:
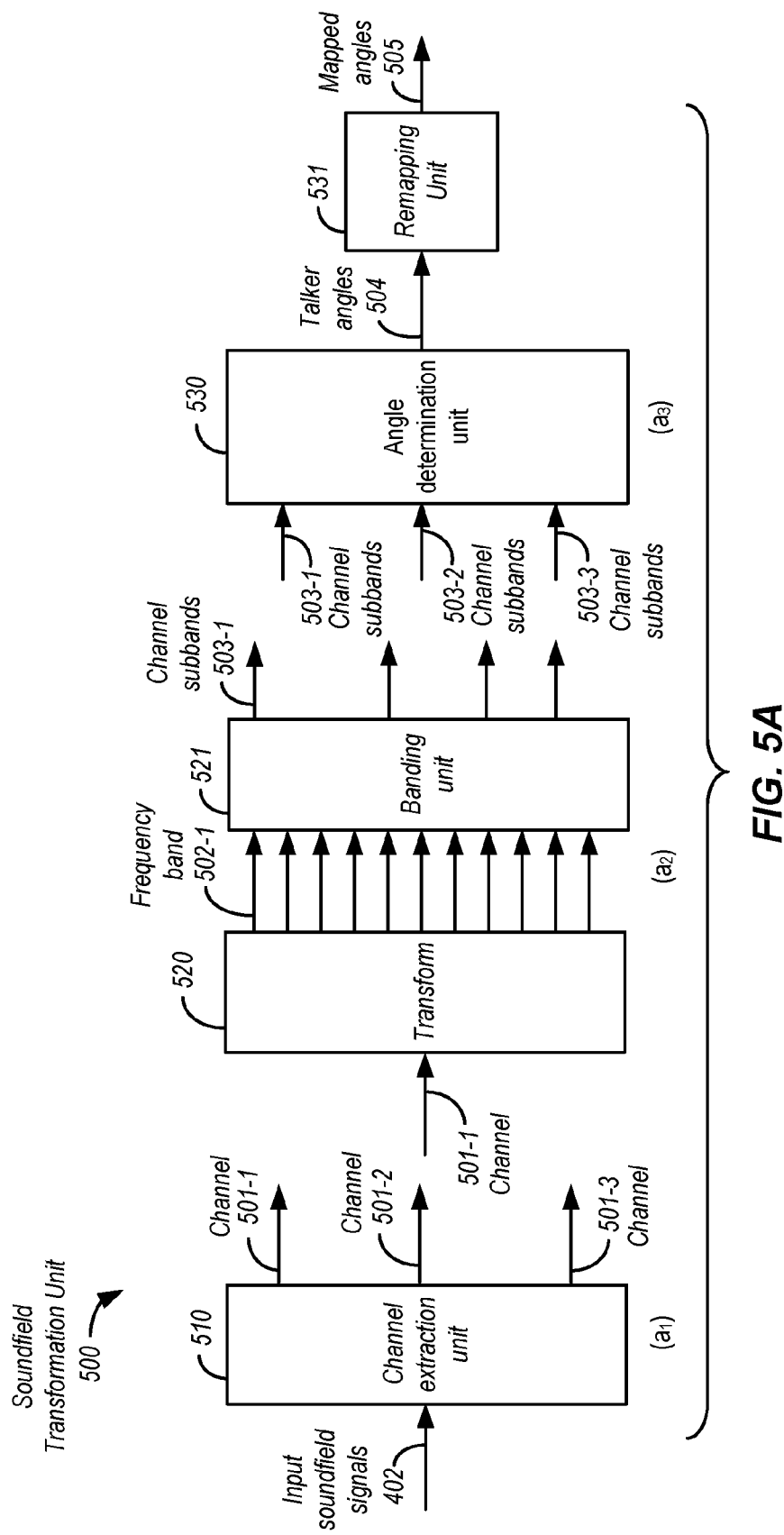
FIGS. 5a and 5b illustrate a block diagram of example components of a soundfield transformation unit.
Figure 5B:
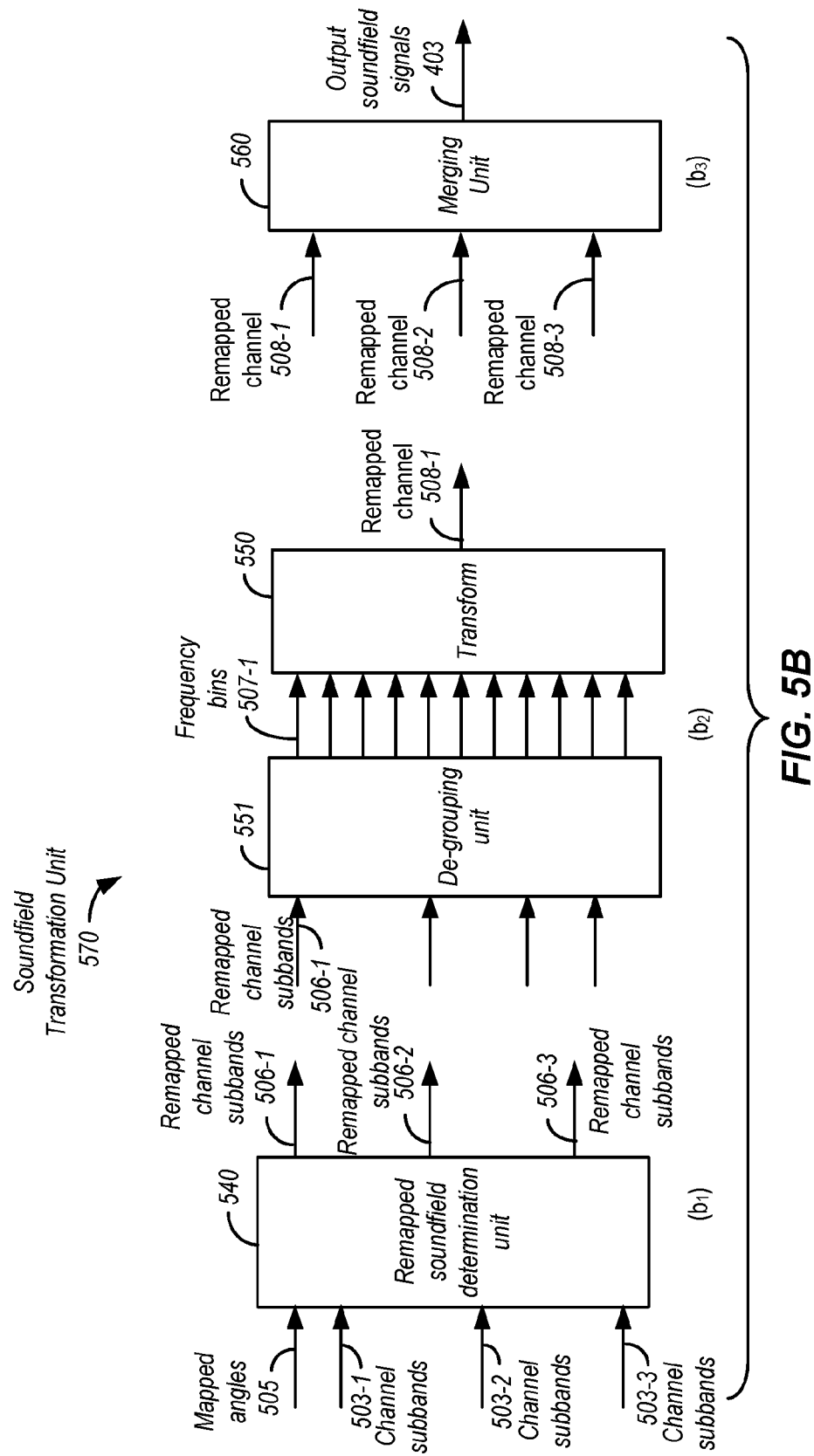

FIGS. 5a and 5b show a soundfield transformation unit 500, 570 (e.g. the soundfield transformation unit 420 in FIG. 4) which is configured to perform a mapping of an input soundfield signal 402 onto a sector 325 of a conference scene 300. The soundfield transformation unit 500, 570 comprises an analysis part 500 and a synthesis part 570, wherein the analysis part 500 is configured to perform a time domain-to-frequency domain transform (e.g. an FFT, Fast Fourier Transform, or a STFT, Short Term Fourier Transform) of the input soundfield signal 402, and wherein the synthesis part 570 is configured to perform a frequency domain-to-time domain transform (e.g. an inverse FFT or an inverse STFT) to yield the output soundfield signal 403.

The soundfield transformation unit 500, 570 is configured to perform a sub-band specific mapping (also referred to as banded re-mapping) of a detected angle of audio within the input soundfield signal 402 onto a limited sector 325 of a conference scene 300. In other words, the soundfield transformation unit 500, 570 is configured to determine the direction of arrival (DOA) of an audio signal within a plurality of different subbands or frequency bins. By doing this, different talkers within the input soundfield signal 402 can be identified. In particular, the DOA analysis within subbands or frequency bins of the input soundfield signal 402 allows to identify the talker locations of a plurality of participants 221 within a meeting room 220. As a consequence, the different identified talker locations may be remapped such that the talker locations remain distinguishable for a listener 301 of the conference scene 300.

The analytic part 500 of the soundfield transformation unit 500, 570 in FIG. 5a comprises a channel extraction unit 510 which is configured to isolate the different channels 501-1, 501-2, 501-3 from the input soundfield signal 402. In case of a first-order horizontal B-format, the channels 501-1, 501-2, 501-3 of the input soundfield signal 402 are the W, X, Y channels, respectively. The channels 501-1 are submitted to a time domain-to-frequency domain transform 520, thereby yielding a respective sets of frequency bins 502-1. In FIG. 5a only the transform 520 of the first channel 501-1 is illustrated. The analysis part 500 typically performs a time domain-to-frequency domain transform 520 for each channel 501-1, 501-2, 501-3 of the input soundfield signal 402. The set of frequency bins 502-1 may optionally be grouped into subbands using a banding unit 521, thereby yielding a set of channel subbands 503-1. The banding unit 521 may be configured to apply a perceptual band structure (e.g. a logarithmic band structure or a Bark scale structure). In the following, reference is made to a set of channel subbands 503-1 in general, wherein the set of channel subbands 503-1 may correspond to the set of frequency bins 502-1 or to a set of groups of frequency bands 502-1.

As such, the analysis part 500 provides a set of channel subbands 503-1, 503-1, 503-3 for each of the channels 501-1, 501-2, 501-3 of the input soundfield signal 402. The sets of channel subbands 503-1, 503-1, 503-3 may be analyzed by an angle determination unit 530 in order to determine a set of talker angles θ 504 for each of the channel subbands. The talker angle θ of a particular channel subband is indicative of the dominant angular direction from which the input soundfield signal 402 in the particular channel subband reaches the microphone of the soundfield endpoint 120. In other words, the talker angle θ of the particular channel subband is indicative of the dominant direction of arrival (DOA) of the input soundfield signal 402 in the particular channel subband. In the present example, only azimuth angles (and no elevation angles) are considered. In other words, the present example is limited to the two dimensional (2D) case.

In case of a first-order horizontal B-format representation of the input soundfield signal 402, the angle determination unit 530 may determine the talker angle θ according to the following formula:

$$\theta_i = \mathrm{atan2}\left(\mathrm{real}\left(\frac{Y_i}{W_i}\right), \mathrm{real}\left(\frac{X_i}{W_i}\right)\right),$$

wherein a tan 2 is the four quadrant arctan function, wherein $\theta_i$ is the talker angle in subband and wherein $Y_i$, $X_i$, $W_i$ are the channel subbands 503-1, 503-2, 503-3 of the input soundfield signal 402 in subband i, respectively, with i=1, ..., N, N being the number of channel subbands (e.g. N=16 or more, 64 or more, 128 or more, 256 or more).

The a tan 2 function provides talker angles θ in the range of −180° to 180°. This complete range should be mapped onto a sector 325 of the conference scene 300, in order to allow for a plurality of endpoints 120 to be included within the same conference scene 300. The mapping should be performed such that there is no discontinuity at the transition from −180° to 180° and vice versa. In particular, it should be ensured that—after remapping—a talker 221 which moves from −180° to 180° does not "jump" from one edge 321 of the sector 325 to another edge 322 of the sector 325, as this would be disturbing for the listener 301. A mapping unit 531 of the soundfield transformation unit 500, 570 may be configured to perform such a continuous, conformal and/or smooth mapping of the set of talker angles θ 504 to a limited sector 325, thereby yielding a set of mapped angles θ' 505. For this purpose, the mapping unit 531 may make use of the following formula $$\theta_i' = \theta_1 + \frac{\Delta_1}{2}\cos(\theta_i),$$

wherein $\theta'_i$ is the mapped angle for subband i, and wherein $\theta_1$ is the mid azimuth angle of the sector 325 and wherein $\Delta_1$ is the angular with of the sector 325 (of the first sector 325 in the illustrated example of FIG. 3). As such, the mapped angles $\theta'_i$ take on values in the range $\theta_1 \pm \Delta_1/2$ of the first sector 325 of the conference scene 300 of FIG. 3. In a similar manner, remapping may be performed onto other sectors 335 of the conference scene 300 (using the mid azimuth angle 333 and the angular width 334).

The synthesis part 570 of the soundfield transformation unit 500, 570 is configured to generate an output soundfield signal 403 which is perceived by the listener 301 to emanate from the selected sector 325 of the conference scene 300. For this purpose, the synthesis part 570 comprises a remapped soundfield determination unit 540 which is configured to determine sets of remapped channel subbands 506-1, 506-2, 506-3 from the sets of channel subbands 503-1, 503-2, 503-3 and from the set of remapped angles θ' 505. For this purpose, the remapped soundfield determination unit 540 may make use of the following formula:

$$\begin{bmatrix} W' \\ X' \\ Y' \end{bmatrix} = \begin{bmatrix} 1 & 0 & 0 \\ \cos\theta' & 0 & 0 \\ \sin\theta' & 0 & 0 \end{bmatrix} \begin{bmatrix} W \\ X \\ Y \end{bmatrix}.$$

The sets of remapped channel subbands 506-1 may be de-grouped in unit 551 to provide the corresponding sets of frequency bins 507-1 (only illustrated in FIG. 5b for the first channel 506-1), and the sets of frequency bins 507-1 may be synthesized using a frequency domain-to-time domain transform 550 to yield the remapped channels 508-1, 508-2, 508-3. The remapped channels 508-1, 508-2, 508-3 are merged in unit 560 to provide the output soundfield signal 403.

In other words, the banded remapping (the subbands may be on a perceptual scale or FFT or circulant transform bins) proceeds by taking each individual subband i of the input soundfield signal 402, and by estimating an instantaneous angle $\theta_i$ 504 of the source energy within that subband i at that time instant (e.g. within a frame of the signal, wherein a frame may cover a pre-determined time interval of the signal, e.g. 20 ms). The input soundfield signal 402 can arise from a P-dimensional input microphone array or from a P-dimensional soundfield representation. The number of dimensions P may e.g. be P=4 in case of a first-order B-format or P=3 in case of a first-order horizontal B-format. The soundfield transformation unit 500, 570 determines an angle estimate $\theta_i$ 504 for each processed audio frame (and for each downsampled subband) using e.g. the above mentioned formula.

Based on the angle $\theta_i$ 504 of the subband i, a single channel signal may be created for the subband i and for the particular time instant. The single channel may be obtained as a mix down of the incoming P channels through the banded filter bank. A function f( ) is used on the estimated angle $\theta_i$ 504 of the subband i, in order to remap the estimated angle $\theta_i$ 504 to an angle $\theta_i'$ 505 within a desired sector 325 for rendering or for recombination with other soundfields within a conference scene.

This modified angle $\theta_i'$ 505 may be used to determine an output soundfield representation or an output signal which may have a number Q of channels, wherein Q may differ from the initial soundfield representation with channel count P (in the illustrated example P=Q). A reconstruction or synthesis filter bank may be used to create the soundfield representation of an output signal.

The mapping function $\theta_i'=f(\theta_i)$ which is applied within the remapping unit 531 preferably has one or more of the following characteristics:
- the mapping function is (reasonably) consistent in perceptual variation and movement between the angle $\theta_i$ and the remapped angle $\theta_i'$;
- the mapping function does not comprise discontinuities (which may occur e.g. when splitting and opening out the full angular space given by a circle).
- the mapping function may impact other dimensions for rendering than the azimuth angle, e.g. the radial distance of the talkers or elevation. By using further dimensions for distinguishing between different talker locations, an overlap or degeneration of the mapping of $\theta_i$ and $\theta_i'$ may occur without folding or transition effects.

In the present document, methods and systems for including soundfield signals into a conference scene have been described. In particular, it has been described how a 2D or 3D soundfield signal may be mapped onto a sector of a conference scene. A linear transformation for performing such a mapping has been described. Furthermore, a mapping scheme has been described, which takes into account the direction of arrival of dominant components of the soundfield signal.

The methods and systems described in the present document may be implemented as software, firmware and/or hardware. Certain components may e.g. be implemented as software running on a digital signal processor or microprocessor. Other components may e.g. be implemented in hardware, for example, as application specific integrated circuits or inside one or more field programmable gate arrays. The signals encountered in the described methods and systems may be stored on media such as random access memory or optical storage media. They may be transferred via networks, such as radio networks, satellite networks, wireless networks or wired networks, e.g. the Internet, a corporate LAN or WAN. Typical devices making use of the methods and systems described in the present document are portable electronic devices or other consumer equipment which are used to store and/or render audio signals.

The invention claimed is:

1. A conference multiplexer comprising a central conference controller and one or more audio servers, the central conference controller being configured to:
   receive, via an audio server, a first input soundfield signal originating from a first soundfield endpoint, wherein the first input soundfield signal is indicative of a soundfield captured by the first soundfield endpoint;
   set up a 2D or 3D conference scene to be rendered to a listener, the conference scene comprising a plurality of talker locations at different angles with respect to the listener;
   provide a first sector within the conference scene; wherein the first sector has a first angular width; wherein the first angular width is greater than zero; and
   transform the first input soundfield signal into a first output soundfield signal, such that for the listener the first output soundfield signal appears to be emanating from the first sector, wherein a first inner talker location and a first outer talker location define inner and outer edges of the first sector, respectively.

2. The conference multiplexer of claim 1, wherein the conference multiplexer is configured to transform the first input soundfield signal into the first output soundfield signal, such that the first output soundfield signal is producible by virtual sources located at the first inner talker location and at the first outer talker location, respectively.

3. The conference multiplexer of claim 2, wherein the virtual sources are planar wave sources.

4. The conference multiplexer of claim 1, wherein the conference multiplexer is configured to project the first input soundfield signal onto the first sector, thereby yielding the first output soundfield signal.

5. The conference multiplexer of claim 1, wherein a transform used to transform the first input soundfield signal into the first output soundfield signal is decomposable into
   a first transform configured to transform the first input soundfield signal into left and right source signals; wherein, if rendered, the left and right source signals would appear to the listener to be emanating from a left and right virtual source located to the left and to the right of the listener on an axis along the left and the right of the listener; and
   a second transform configured to transform the left and right source signals into the output soundfield signal, such that the left source signal appears to the listener to be emanating from the first outer talker location and such that the right source signal appears to the listener to be emanating from the first inner talker location.

6. The conference multiplexer of claim 1, wherein the first input soundfield signal comprises a multi-channel audio signal indicative of a direction of arrival of a sound signal coming from a talker at the first soundfield endpoint.

7. The conference multiplexer of claim 1, wherein the first input soundfield signal comprises a first-order ambisonic input signal; wherein the first-order ambisonic input signal comprises an omnidirectional input channel and at least two directional input channels; wherein the at least two directional input channels are associated with at least two directions which are orthogonal with respect to one another.

8. The conference multiplexer of claim 1, wherein the first sector comprises a plurality of talker locations and wherein the plurality of talker locations are located at different angles on a circle or a sphere around the listener.

9. The conference multiplexer of claim 1, wherein the first output soundfield signal comprises a multi-channel audio signal indicative of a sound signal coming from a virtual talker location within the first sector.

10. The conference multiplexer of claim 1, wherein the first output soundfield signal comprises a first-order ambisonic output signal; wherein the first-order ambisonic output signal comprises an omnidirectional output channel and at least two directional output channels; wherein the at least two directional output channels are associated with at least two directions which are orthogonal with respect to one another.

11. The conference multiplexer of claim 1, wherein the conference multiplexer is configured to place a plurality of input soundfield signals at a corresponding plurality of sectors within the conference scene.

12. The conference multiplexer of claim 11, wherein the conference multiplexer is configured to transform the plurality of input soundfield signals into a plurality of output soundfield signals, such that for the listener the plurality of output soundfield signals appears to be emanating from virtual talker locations within the plurality of sectors, respectively.

13. The conference multiplexer of claim 12, wherein the conference multiplexer is configured to multiplex the plurality of output soundfield signals into a multiplexed soundfield signal, such that for the listener spatial cues of the multiplexed soundfield signal are the same as spatial cues of the plurality of output soundfield signals.

14. The conference multiplexer of claim 1, wherein a transform used to transform the first input soundfield signal into the first output soundfield signal comprises a direction-of-arrival analysis of the soundfield indicated by the first input soundfield signal, thereby yielding an estimated angle of arrival of the soundfield at the first soundfield endpoint.

15. The conference multiplexer of claim 14, wherein
   the transform comprises a time domain-to-frequency domain transform of the first input soundfield signal;
   the direction-of-arrival analysis of the soundfield is performed in the frequency domain; thereby yielding a plurality of estimated angles of arrival for a corresponding plurality of subbands;
   the transform comprises a mapping of the plurality of estimated angles to the first sector, thereby yielding a corresponding plurality of remapped angles; wherein the first output soundfield signal is determined based on the plurality of remapped angles.

16. The conference multiplexer of claim 15, wherein the time domain-to-frequency domain transform comprises
   one or more of: a Fast Fourier Transform, a Short Term Fourier Transform, a Modified Discrete Fourier Transform, a Quadrature Mirror filter bank; and/or
   a subband grouping of one or more frequency bins into a subband.

17. The conference multiplexer of claim 15, wherein the subbands of the plurality of subbands have frequency ranges which follow a psychoacoustic scale, e.g. a logarithmic scale or a Bark scale.

18. The conference multiplexer of claim 1, wherein
   the conference scene is a 2D conference scene;
   a first midpoint of the first sector is located at a first azimuth angle from an axis in front of a head of the listener;
   the first sector has a first azimuth angular width; and
   the first sector ranges from an outer angle at the first azimuth angle plus half of the first azimuth angular width to an inner angle at the first azimuth angle minus half of the first azimuth angular width.

19. The conference multiplexer of claim 1, wherein the audio servers are implemented via one or more digital signal processors, processing modules or software threads stored on non-transitory media and executed by one or more processors.

20. A teleconferencing method, comprising:
   receiving a first input soundfield signal originating from a first soundfield endpoint, wherein the first input soundfield signal is indicative of a soundfield captured by the first soundfield endpoint;
   setting up a 2D or 3D conference scene to be rendered to a listener, the conference scene comprising a plurality of talker locations at different angles around the listener;
   providing a first sector within the conference scene; wherein the first sector has a first angular width; wherein the first angular width is greater than zero; and
   transforming the first input soundfield signal into a first output soundfield signal, such that for the listener the first output soundfield signal appears to be emanating from the first sector, wherein a first inner talker location and a first outer talker location define inner and outer edges of the first sector, respectively.

* * * * *